(12) United States Patent  (10) Patent No.: US 8,230,036 B2
Ishikawa et al.  (45) Date of Patent: Jul. 24, 2012

(54) USER PROFILE OPENING APPARATUS AND METHOD

(75) Inventors: Hidemi Ishikawa, Tokyo (JP); Chikara Takauji, Tokyo (JP); Masakazu Inoue, Tokyo (JP); Tomoko Ikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 2016 days.

(21) Appl. No.: 10/863,350

(22) Filed: Jun. 9, 2004

(65) Prior Publication Data

US 2004/0255304 A1   Dec. 16, 2004

(30) Foreign Application Priority Data

Jun. 10, 2003  (JP) ................................. 2003-165063

(51) Int. Cl.
    *G06F 15/16*  (2006.01)
(52) U.S. Cl. ........ 709/217; 709/218; 709/219; 709/223; 709/224; 709/225; 705/14.66; 705/38; 705/40; 705/402; 705/909
(58) Field of Classification Search ................ 707/3–10; 709/203–229; 715/203; 370/241; 705/35; 455/412.1–456.1
    See application file for complete search history.

(56) References Cited

U.S. PATENT DOCUMENTS

| | | | | |
|---|---|---|---|---|
| 5,848,397 A * | 12/1998 | Marsh et al. | ................ | 705/14.61 |
| 6,175,857 B1 * | 1/2001 | Hachiya et al. | ................ | 709/206 |
| 6,311,195 B1 * | 10/2001 | Hachiya et al. | ................ | 715/203 |
| 6,336,133 B1 * | 1/2002 | Morris et al. | ................ | 709/204 |
| 6,360,221 B1 * | 3/2002 | Gough et al. | ................... | 707/10 |
| 6,704,039 B2 * | 3/2004 | Pena | ......................... | 348/14.01 |
| 6,832,242 B2 * | 12/2004 | Keskar | .......................... | 709/204 |
| 6,876,974 B1 * | 4/2005 | Marsh et al. | ................ | 705/14.44 |
| 6,941,376 B2 * | 9/2005 | Mitchell et al. | ................ | 709/229 |
| 6,990,180 B2 * | 1/2006 | Vuori | ........................ | 379/88.25 |
| 7,003,546 B1 * | 2/2006 | Cheah | .......................... | 709/200 |
| 7,154,616 B2 * | 12/2006 | Watanabe et al. | ............. | 358/1.13 |
| 7,299,361 B1 * | 11/2007 | Kim et al. | ..................... | 713/188 |
| 7,461,397 B2 * | 12/2008 | Karamchedu et al. | ........ | 709/206 |
| 7,496,628 B2 * | 2/2009 | Arnold et al. | ................. | 709/206 |
| 7,523,045 B1 * | 4/2009 | Walker et al. | ................ | 705/7.14 |
| 7,818,425 B2 * | 10/2010 | Malik | ........................... | 709/225 |

(Continued)

FOREIGN PATENT DOCUMENTS

JP  2002-109025 A   4/2002

(Continued)

OTHER PUBLICATIONS

PDF of JP2000194666, published on Jul. 14, 2000 by Hirotaka Hashimoto.*

(Continued)

*Primary Examiner* — Backhean Tiv
(74) *Attorney, Agent, or Firm* — Sughrue Mion, PLLC

(57) ABSTRACT

The server of a communication system determines a communication growth level that is the level of growth of communication between one user and another user based on the cumulative count of mail send/receive events, and stores the determined growth level in the communication growth level Data Base. When the server receives a profile view request to view the profile of user A from the terminal of user B, the server determines the range of profile information to be opened for user B out of the profile of user A, based on the communication growth level of the pair of user A and user B stored in the communication growth level Data Base.

23 Claims, 7 Drawing Sheets

U.S. PATENT DOCUMENTS

| | | | |
|---|---|---|---|
| 2001/0054030 A1* | 12/2001 | Igarashi | 705/401 |
| 2002/0135805 A1* | 9/2002 | Fahraeus et al. | 358/1.15 |
| 2002/0169626 A1* | 11/2002 | Walker et al. | 705/1 |
| 2002/0174188 A1* | 11/2002 | Clark et al. | 709/213 |
| 2002/0184322 A1* | 12/2002 | Simpson et al. | 709/206 |
| 2003/0195937 A1* | 10/2003 | Kircher et al. | 709/207 |
| 2003/0208439 A1* | 11/2003 | Rast | 705/38 |
| 2004/0003030 A1* | 1/2004 | Abe | 709/203 |
| 2004/0169722 A1* | 9/2004 | Pena | 348/14.01 |
| 2004/0193691 A1* | 9/2004 | Chang | 709/206 |
| 2004/0203896 A1* | 10/2004 | Deigin et al. | 455/456.1 |
| 2004/0243679 A1* | 12/2004 | Tyler | 709/206 |
| 2005/0157654 A1* | 7/2005 | Farrell et al. | 370/241 |
| 2005/0240432 A1* | 10/2005 | Jensen | 705/1 |
| 2006/0041505 A1* | 2/2006 | Enyart | 705/40 |
| 2007/0124204 A1* | 5/2007 | de Boer et al. | 705/14 |
| 2009/0049049 A1* | 2/2009 | Cheah | 707/9 |
| 2009/0164233 A1* | 6/2009 | Arnold et al. | 705/1 |

FOREIGN PATENT DOCUMENTS

| | | |
|---|---|---|
| JP | 2002-118682 A | 4/2002 |
| JP | 2002-157200 A | 5/2002 |
| JP | 2002-259318 A | 9/2002 |
| JP | 2003-58484 A | 2/2003 |

OTHER PUBLICATIONS

PDF of JP2002157200 which is cited in the IDS Published on May 31, 2002.*

* cited by examiner

| SOURCE | DESTINATION | NUMBER OF CHARACTERS | NUMBER OF PICTORIAL SYMBOLS | DATE/TIME OF SENDING |
|---|---|---|---|---|
| : | : | : | : | : |
| USER B | USER A | 145 | 4 | 2003.4.24 |
| USER A | USER B | 286 | 3 | 2003.4.29 |
| USER A | USER C | 158 | 2 | 2003.5.2 |
| : | : | : | : | : |

Fig. 3

| COMMUNICATION GROWTH LEVEL | CUMULATIVE COUNT OF SEND/RECEIVE EVENTS |
|---|---|
| LEVEL 1 | 1 OR LESS |
| LEVEL 2 | 2-5 |
| LEVEL 3 | 6 OR MORE |

Fig. 4

| USER 1 | USER 2 | COMMUNICATION GROWTH LEVEL |
|---|---|---|
| USER A | USER B | LEVEL 1 |
| USER C | USER D | LEVEL 3 |
| . | . | . |
| . | . | . |
| . | . | . |
| . | . | . |

Fig. 5

USER PROFILE OPENING APPARATUS AND METHOD

This application is based upon and claims the benefit of priority from Japanese Patent Application No. 165063/2003 filed on Jun. 10, 2003, the content of which are incorporated by reference.

BACKGROUND OF THE INVENTION

1. Field of the Invention

The present invention relates to a user profile opening apparatus and method, and more particularly, to a user profile opening apparatus and method for opening one user's profile in response to a view request from some other user terminal on a community site.

2. Description of the Related Art

The Japanese Patent Application Publication Laid-Open Kokai No. 058484/2003 describes community sites for users of similar tastes and the like to communicate with each other via a network such as the Internet.

Moreover, The Japanese Patent Application Publication Laid-Open Kokai No. 1186821/2002 discloses a communication system for presenting one's picture to introduce themselves with their appearance and impression to others.

It is not preferable, however, for security reasons to open one's profile including their picture, name, address, age or phone number on the network. Therefore, taking only the security facet into consideration, it is preferable for one to minimize the profile information to be opened to others.

On the other hand, if you communicate with other users on a community site, it would be more favorable to open your profile as much as possible and provide more, information to others. This is because that would make it possible to increase the number of people that you can get to know or to give a sense of security to someone whom you have come to know. Moreover, by opening your profile as much as possible, you could become closer to your mail friend.

However, in conventional communication systems described in such as the above Japanese Laid-Open Kokai publications, if you want to make your profile open to only someone with whom you have become acquainted and you are sure about safety, while ensuring security, you have to set different ranges of profile information to be opened for other users on a per-user basis. Particularly, if you communicate with a great number of users, to set different per-user ranges of profile information to be opened to the users would be quite a troublesome operation that is required of the user and this is not practical.

In the foregoing conventional communication systems, there has been a problem that it is difficult to open one's profile for other users on a community site while ensuring security.

SUMMARY OF THE INVENTION

The object of the present invention is to provide a use profile opening apparatus and method which open one's profile to other users on a community site while ensuring security.

In order to achieve the foregoing objects, the present invention includes: receiving a request for a user profile of a user from another user; and determining contents of profile of the user opened for the another user based on mail information for mail communicated between the user and the another user.

The determining step may determine the contents of profile of the user opened for another user based on a cumulative count of mail events performed between the user and another user. Also, the determining step may determine the contents of profile of the user opened for another user based on time elapsed after the user or another user receives mail from the user or another user until the user or another user sends a reply to the user or another user. Furthermore, the determining step may determine the contents of the profile of the user opened for another user based on frequency of mail between the user and another user terminal. Moreover, the determining step may determine the contents of profile of the user opened for another user based on a period from the time when the first mail sending or receiving was performed between the user and another user to the present time. Still furthermore, the determining step may determine the contents of profile of the user opened for another user based on the total number of characters in mail between the user and another user.

The determining step may determine the contents of profile of the user opened for another user based on the total number of pictorial symbols included in mail sent and received between the user and another user.

The present invention may further comprise generating a user profile to be opened for the another user from pre-stored user profile of the user, or generating a picture of the user opened for another user based on pre-stored pictures.

Another exemplary embodiment of the present invention includes: receiving a request for a user profile of a user from another user, determining, from mail information for mail between the user and another user, a communication growth level that is the level of growth of communication between the user and another user; and changing the user profile opened for another user according to the determined communication growth level.

The determining step may determine the communication growth level based on a cumulative count of mail events between the user and another user. Moreover, the determining step may determine the communication growth level based on time elapsed after the user or another user receives mail from the user or another user until the user or another user sends a reply to the user or another user. Furthermore, the determining step may determine the communication growth level based on frequency of mail between the user and another user terminal. Still furthermore, the determining step may determine the contents of profile of the user opened for another user based on a period from the time when the first mail sending or receiving was performed between the user and another user to the present time.

Also, the determining step may determine the communication growth level based on the total number of characters in mail between the user and another user. The determining step may determine the communication growth level based on the total number of pictorial symbols included in mail sent and received between the user and another user.

Still another exemplary embodiment of the present invention comprises allowing a communication system to open a user profile of a user for another user if mail is sent from said user to said another user.

Still furthermore, another exemplary embodiment of the present invention comprises allowing a communication system to open a user profile of a user for another user if mail is sent from the user to another user and mail is sent from another user to the user. The present invention may further comprise opening other party's profiles for both the user and another user, respectively, at the same time.

Still furthermore, another exemplary embodiment of the present invention includes: a receiver which receives a request for a user profile of a user from another user, and a determining circuit which determines contents the of profile of the user to be opened for another user based on mail information for mail communicated between the user and another user.

In the present invention, the determining circuit may determine the contents of the profile of the user to be opened for another user based on a cumulative count of mail events between the user and another user. Also, the determining circuit may determine the contents of profile of the user to be opened for another user based on time elapsed after the user or another user receives mail from the user or another user until the user or another user sends a reply to the user or another user. Furthermore, the determining circuit may determine the contents of profile of the user to be opened to another user based on frequency of mail between the user and another user terminal. Moreover, the determining step may determine the contents of profile of the user opened for another user based on a period from the time when the first mail sending or receiving was performed between the user and another user to the present time. Still further more, the determining circuit may determine the contents of profile of the user to be opened for another user based on the total number of characters in mail between the user and another user.

The determining circuit may determine the contents of profile of the user to be opened for another user based on the total number of pictorial symbols included in mail sent and received between the user and another user.

The present invention may further comprise a generator which generates a user profile to be opened for another user from a pre-stored user profile of the user, or a generator which generates a picture of the user to be opened for another user based on pre-stored pictures.

Still another exemplary embodiment of the present invention includes: a receiver which receives a request for a user profile of a user from another user; a determining circuit which determines, from mail information for mail between the user and another user, a communication growth level that is the level of growth of communication between the user and another user; and changer which changes the user profile to be opened for another user according to the determined communication growth level.

In the present invention, the determining circuit may determine the communication growth level based on a cumulative count of mail events between the user and another user. Also, the determining circuit may determine the communication growth level based on time elapsed after the user or another user receives mail from the user or another user until the user or another user sends a reply to the user or another user. Moreover, the determining circuit may determine the communication growth level based on frequency of mail between the user and another user terminal. Furthermore, the determining step may determine the contents of profile of the user opened for another user based on a period from the time when the first mail sending or receiving was performed between the user and another user to the present time. Still furthermore, the deciding circuit may determine the communication growth level based on the total number of characters in mail between the user and another user.

The determining circuit also may determine the communication growth level based on the total number of pictorial symbols included in mail sent and received between the user and another user.

The present invention may further include a generator which generates a user profile to be opened for another user from a pre-stored user profile of the user, or a generator which generates a picture of the user to be opened for another user based on pre-stored pictures.

Still another exemplary embodiment of the present invention includes: a receiver which receives mail sent from a user to another user; and an allowing circuit which allows a user profile of a user to be opened for another user if the receiver receives the mail.

Still another exemplary embodiment of the present invention includes: a receiver which receives mail; and an allowing circuit which allows a user profile of a user to be opened for another user if the receiver receives mail sent from the user to another user and mail sent from another user to the user. The present invention may further include an opening circuit which opens other party's profiles to both the user and another user, respectively, at the same time.

Still another exemplary embodiment of the present invention includes: receiving means for receiving a request for a user profile of a user from another user, and determining means for determining the contents of a profile of the user to be opened for another user based on mail information for mail communicated between the user and another user.

The determining means may determine the contents of the profile of the user to be opened for another user based on a cumulative count of mail events between the user and another user. Also, the determining means may determine the contents of the profile of the user to be opened for another user based on time elapsed after the user or another user receives mail from the user or another user until the user or another user sends a reply to the user or another user. Furthermore, the determining means may determine the contents of the profile of the user to be opened to another user based on frequency of mail between the user and another user terminal. Moreover, the determining step may determine the contents of profile of the user opened for another user based on a period from the time when the first mail sending or receiving was performed between the user and another user to the present time. Still furthermore, the determining means may determine the contents of profile of the user to be opened for another user based on the total number of characters in mail between the user and another user.

The determining means may determine the contents of profile of the user to be opened for another user based on the total number of pictorial symbols included in mail sent and received between the user and another user.

The present invention may further include generating means for generating a user profile to be opened for another user from a pre-stored user profile of the user, or generating means for generating a picture of the user to be opened for another user based on pre-stored pictures.

Still another exemplary embodiment of the present invention includes: receiving means for receiving a request for a user profile of a user from another user; determining means for determining, from mail information for mail between the user and another user, a communication growth level that is the level of growth of communication between the user and another user; and changing means for changing the user profile to be opened for another user according to the determined communication growth level.

The determining means may determine the communication growth level based on a cumulative count of mail events between the user and another user. Also, the determining means may determining the communication growth level based on time elapsed after the user or another user receives mail from the user or another user until the user or another user sends a reply to the user or another user. Furthermore, the determining means may determine the communication growth level based on frequency of mail between the user and another user terminal. Moreover, the determining step may determine the contents of profile of the user opened for another user based on a period from the time when the first mail sending or receiving was performed between the user and another user to the present time. Still further more, the determining means may determine the communication growth level based on the total number of characters in mail between the user and another user.

The determining means may determine the communication growth level based on the total number of pictorial symbols included in mail sent and received between the user and another user.

The present invention may further include generating means for generating a user profile to be opened for another user from a pre-stored user profile of the user, or generating means for generating a picture of the user to be opened for another user based on pre-stored pictures.

Still another exemplary embodiment of the present invention includes: receiving means for receiving mail sent from a user to another user; and allowing means for allowing the user profile of a user to be opened for another user if the receiving means receives the mail.

Still another exemplary embodiment of the present invention includes: receiving means for receiving mail; and allowing means for allowing a user profile of a user to be opened for another user if the receiving means receives mail sent from the user to another user and mail sent from another user to said user. The present invention may further include opening means for opening other party's profiles to both the user and another user, respectively, at the same time.

Still another exemplary embodiment of the present invention includes: a transmitter which transmits mail to counter part user apparatus through a server; a receiver which receives mail from said counterpart user apparatus, and an viewer which presents the user profile of a user of the counterpart apparatus sent from the server, wherein the user profile includes contents determined by the server based on mail information for mail communicated with the counterpart apparatus.

In the present invention, the transmitter may transmit a request signal to the server to obtain a user profile. Also, in the present invention, the viewer may present a picture of the user of the counterpart apparatus generated by the server based on pre-stored pictures in the server.

Still another exemplary embodiment of the present invention comprises: transmitting means for transmitting mail to counter part user apparatus through a server; receiving means for receiving mail from the counterpart user apparatus, and viewing means for presenting the user profile of a user of the counterpart apparatus sent from the server, wherein the user profile includes contents determined by the server based on mail information for mail communicated with the counterpart apparatus.

In the present invention, the transmitting means may transmit a request signal to the server to obtain a user profile. Also, in the present invention, the viewing means may present a picture of the user of said counterpart apparatus generated by the server based on pre-stored pictures in the server.

BRIEF DESCRIPTION OF THE DRAWINGS

These and other objects, features and advantages of the invention will be become fully apparent from the following detailed description taken in conjunction with accompanying drawings.

FIG. 3 is a table chart showing an example of mail information which is stored in the mail information DB.

FIG. 4 is a table chart showing an example of the criterion of decision by which the communication growth level is determined, based on the cumulative count of send/receive events for mail sent and received between two users.

FIG. 5 is a table chart showing concrete examples of the communication growth levels stored in the communication growth level DB.

DETAILED DESCRIPTION OF THE EXEMPLARY EMBODIMENTS

The exemplary embodiments described herein are intended to assist with the understanding of the invention, and are not intended to limit the scope of the invention in any way.

Figure 1:
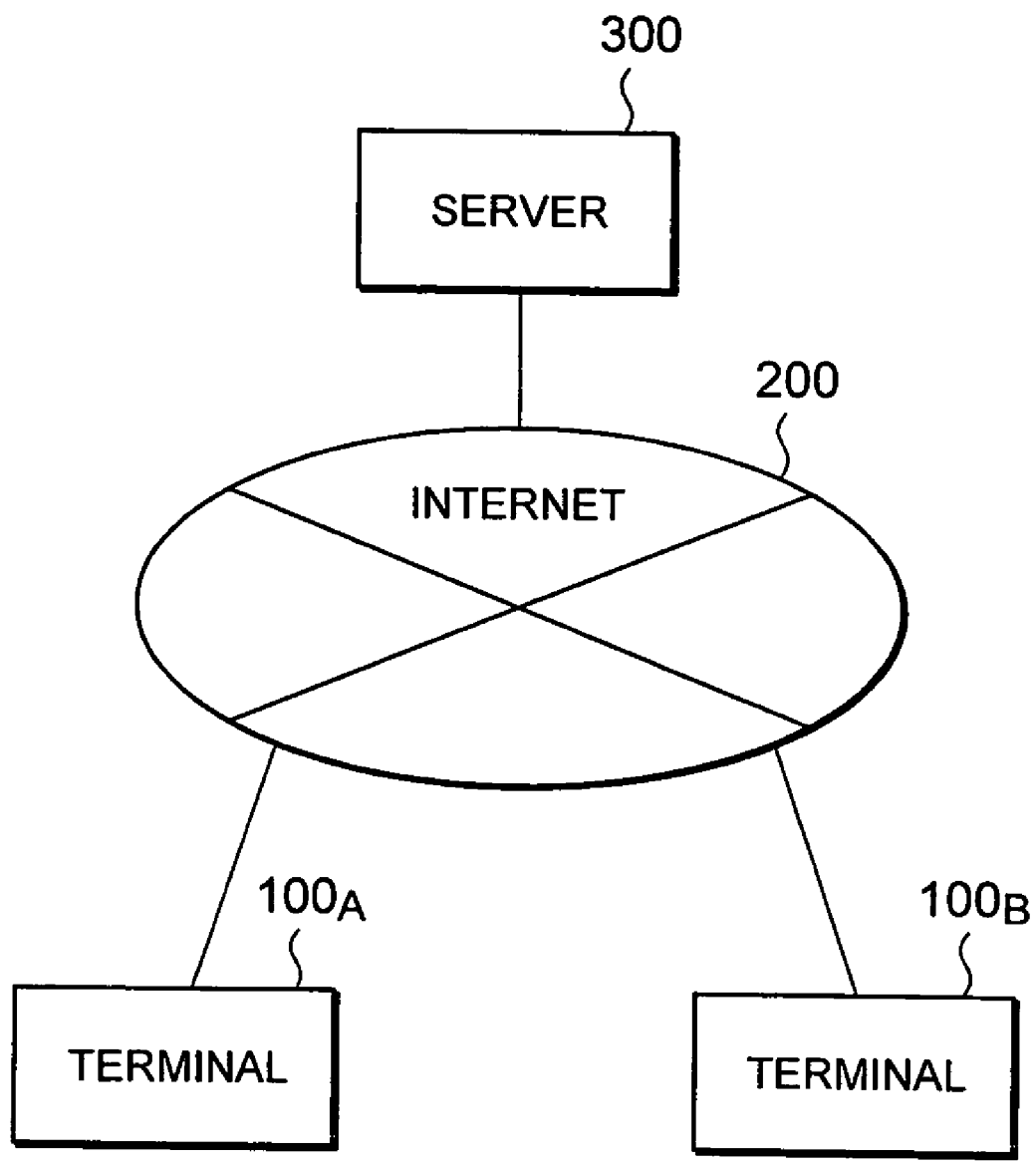
FIG. 1 is a block diagram of the topology of a communication system of an exemplary embodiment according to the present invention.

FIG. 1 shows a block diagram of the topology of a communication system of an exemplary embodiment according to the present invention. The communication system includes server 300 and terminals 100A, 100B Server 300 offers a community service to provide for communication between a plurality of terminals 100A, 100B of users A and B. Terminals 100A, 100B are connected by a network such as Internet 200.

Figure 2:
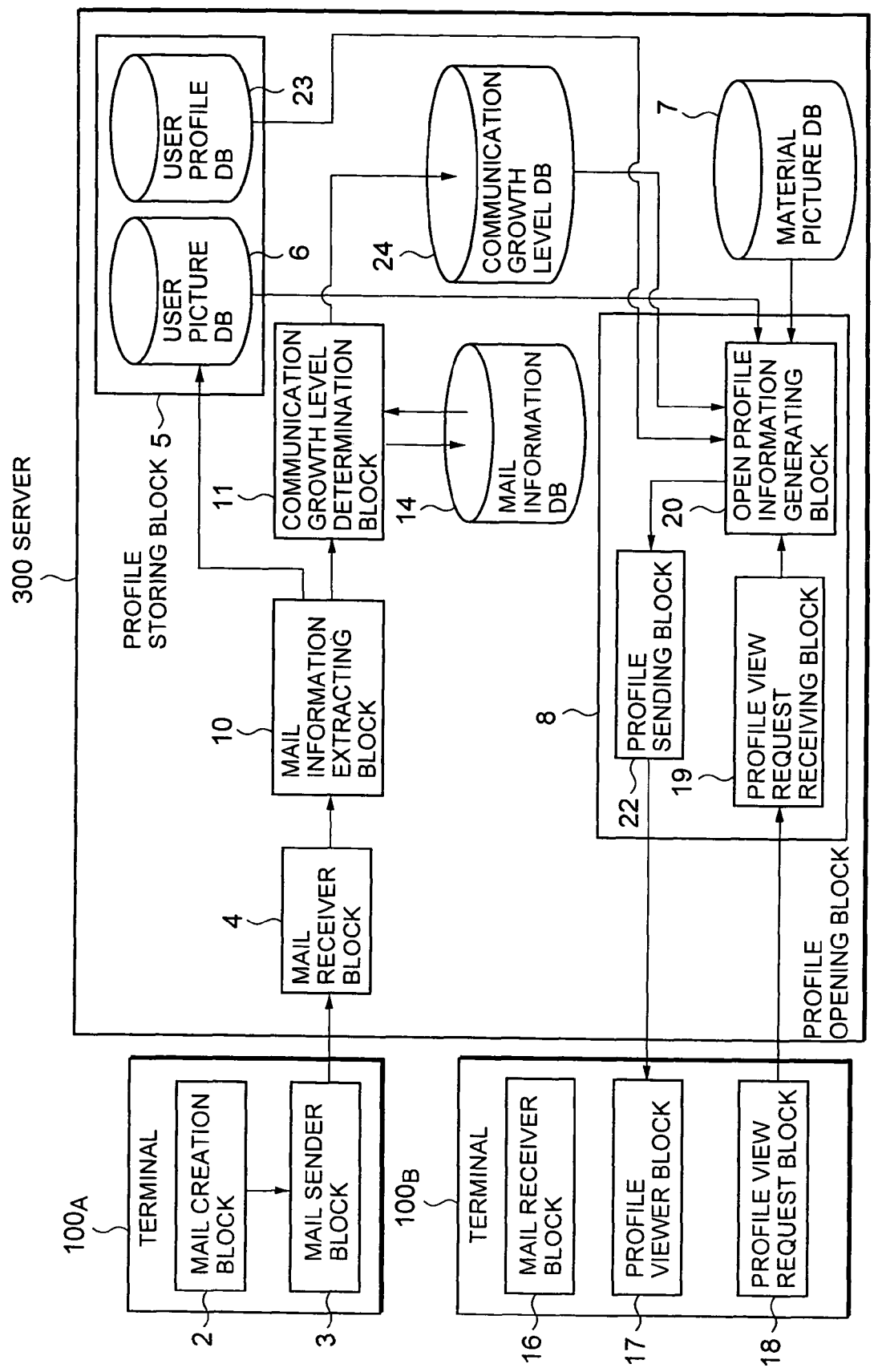
FIG. 2 is a block diagram showing a configurations of the server and the terminals.

FIG. 2 is a block diagram showing a configuration of server 300 and terminals 100A, 100B. To simplify the explanation, FIG. 2 shows only the configurations required for sending electronic mail from terminal 100A to the terminal 100B. However, sending mail from terminal 100B to the terminal 100A can be carried out through a similar configuration. Although the Internet 200 shown in FIG. 1 is not shown in FIG. 2, Terminals 100A, 100B, and server 300 are assumed to be connected via Internet 200.

Referring to FIG. 2, terminal 100A includes a mail creation block 2 and a mail sender block 3. Mail creation block 2 creates mail to be sent to terminal $100_B$. Mail sender block 3 sends the mail created by mail creation block 2 to server 300.

Terminal 100B comprises mail receiver block 16, profile viewer block 17, and profile view request block 18. Mail receiver block 16 receives mail sent from server 300. Profile view request block 18 sends a profile view request to view another user's profile to server 300. Profile viewer block 17 presents the profile of another user sent from server 300 in response to the profile view request.

Server 300 comprises mail receiver block 4, mail information extracting block 10, communication growth level determination block 11, profile storing block 5, mail information database (DB) 14, communication growth level DB 24, material picture DB 7, and profile opening block 8.

Mail receiver block 4 receives mail that is sent from terminal 100A of the user A to terminal 100B of the user B.

Mail information extracting block 10 extracts mail information which includes of header information, which includes of source and destination addresses and mail data quantity information, and mail contents information from the mail received by mail receiver block 4 and delivers the mail information to communication growth level decision block 11. If picture data is included in the mail received by mail receiver block 4, information extracting block 10 also extracts the picture data and delivers the picture data to the profile storing block 5.

Mail information DB 14 stores the mail information extracted by mail information extracting block 10, transferred thereto via communication growth level determination block 11. An example of mail information that is stored on mail information DB 14 is shown in FIG. 3.

FIG. 3 is a table chart showing an example of mail information which is stored in mail information DB 14. Referring to FIG. 3, for mail sent and received between the users, the source, destination, number of characters, number of pictorial symbols, and date/time of sending each item of mail are stored.

In FIG. 2, profile storing block 5 includes user picture DB 6 and user profile DB 23.

User picture DB 6 stores picture data such as a users' facial portraits extracted by mail information extracting block 10.

User profile DB 23 contains users' profiles that have been stored in advance. The user profile includes sex, age and mail address, as an example.

Material picture DB 7 stores various pictures such as animals and avatars. Here, the avatar is a character on the web. The avatar picture can be created by the user setting or can be created automatically, based on the actual facial image of the user. The stored pictures are compared with a users' facial portraits stored in user picture DB 6.

Communication growth level determination block 11 determines the communication growth level that is the level of growth of communication between one user and some other user from the mail information stored in mail information DB 14. The methods in which communication growth level determination block 11 specifically determines the communication growth level are described below.

For example, communication growth level determination block 11 may determine the communication growth level based on a cumulative count of mail send/receive events between the terminals of users for whom this determination is made. That is, the higher the count of mail send/receive events between two users for whom this determination is made, that the higher communication growth level will be determined to be.

Communication growth level determination block 11 may determine the communication growth level the criterion based on the cumulative count of send/receive events for mail sent and received between two users.

FIG. 4. is a table chart showing an example of the determination criterion which are used to determine the communication growth level, based on the cumulative count of send/receive events for mail sent and received between two users. In FIG. 4, the determination criterion are shown in which the communication growth level is determined as level 1 when the cumulative count of send/receive events is 1 or less, as level 2 when the cumulative count of send/receive events is 2-5, and as level 3 when the cumulative count of send/receive events is 6 or more.

Likewise, communication growth level determination block 11 may determine the communication growth level, based on time elapsed after one of the users for whom this determination is made receives mail until sending a reply to the other user. Moreover, communication growth level determination block 11 may determine the communication growth level, based on the frequency of mail sending/receiving between the users for whom this determination is made. For example, if the number of times of mail sending/receiving per day or week exceeds a predetermined number of times, the communication growth level between the two users is determined to be higher.

Likewise, communication growth level determination block 11 may determine the communication growth level, based on a period during which mail shave been exchanged between the users for whom this determination is made. Here, the period of mail exchange refers to the period from the time when the first mail sending/receiving was performed between the two users for whom this determination is made up to the present time.

Also, communication growth level determination block 11 may determine the communication growth level, based on the total number of characters included in mail sent and received between the users for whom this determination is made, or may determine the communication growth level, based on the total number of pictorial symbols included in mail sent and received between the users for whom this determination is made. This is based on the fact that the number of characters in mail or the number of pictorial symbols included in mail tend to increase, as the communication growth level rises.

Communication growth level DB 24 functions as a communication growth level storing entity and stores communication growth levels per pair of users determined by communication growth level determination block 11.

FIG. 5 shows examples of the communication growth levels stored in communication growth level DB 24. In FIG. 5, for example, the following are stored: communication growth level 1 between user A and user B; and communication growth level 3 between user C and user D.

Profile opening block 8 includes profile view request receiving block 19, open profile information generating block 20, and profile sending block 22.

Profile view request receiving block 19 receives a profile view request form terminal 100B and delivers it to open profile information generating block 20.

From profile view request receiving block 19, when open profile information generating block 20 receives a profile-view request to view user A's profile issued from terminal 100B of user B, it retrieves the user picture data of user A from user picture DB 6 and retrieves the user profile of user A from the user profile DB 23.

Open profile information generating block 20 reads the communication growth level between the view requesting user B and user A, for whom viewing the profile is requested from communication growth level DB 24, and determines what profile is opened for user B out of the retrieved user profile and user picture data of user A. Open profile information generating block 20 then generates a new picture, using the user picture determined to be opened and a material picture retrieved from material picture DB 7 and combines the generated picture with the user profile determined to be opened, generating a profile to be opened for user B.

Profile sending block 22 sends the profile determined to be opened to the user B by open profile information generating block 20 to terminal 100B of the user B.

Next, the detailed operation of the communication system of the exemplary embodiment will be described.

Figure 6:
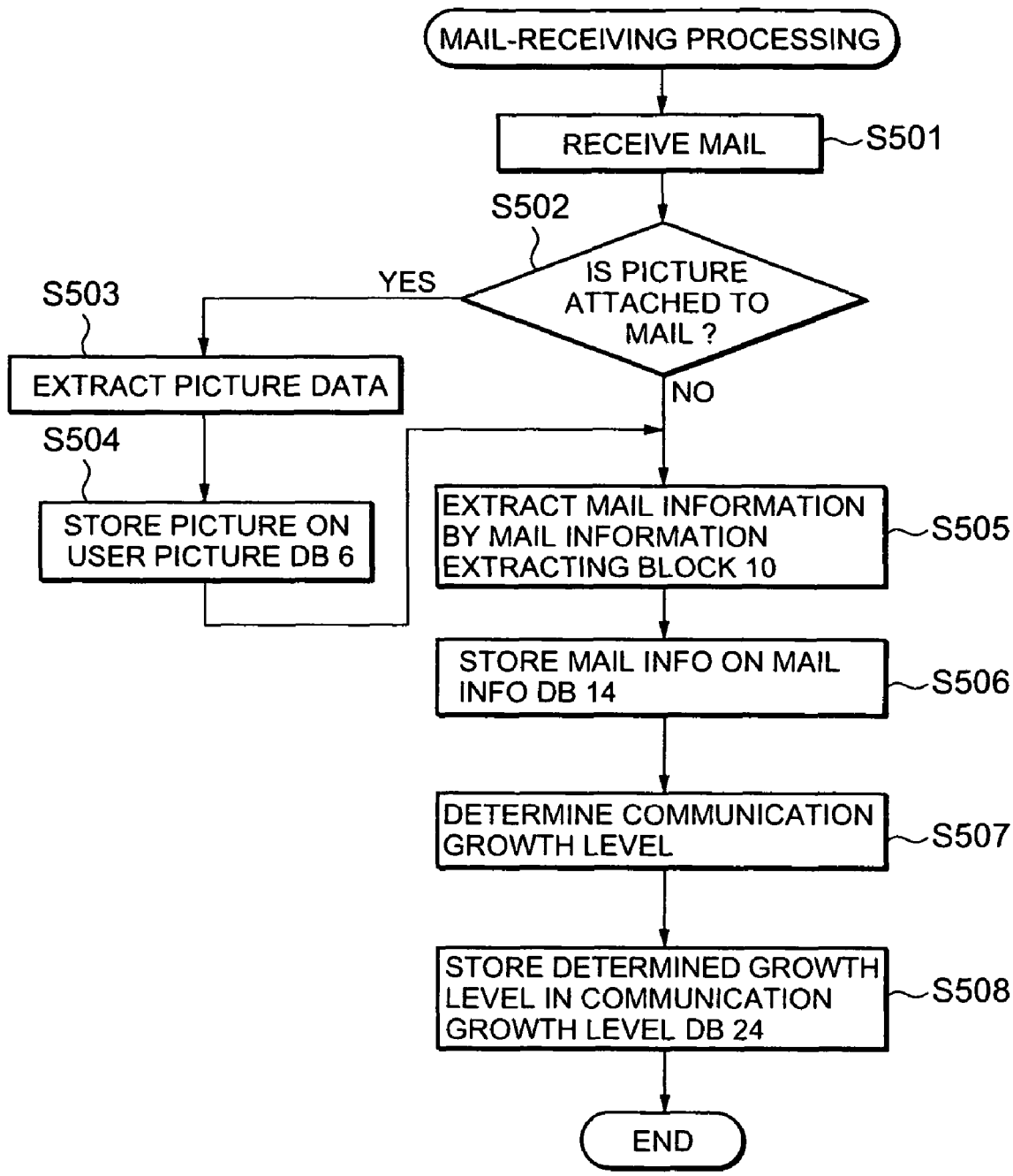
FIG. 6 is a flowchart illustrating the operation in mail-receiving processing of the server.

FIG. 6 is a flowchart illustrating the operation of mail-receiving processing in server 300.

Referring to FIG. 6, mail from terminal 100A is received by mail receiver block 4 (step S501). Mail information extracting block 10 determines whether or not picture data is attached to mail received by mail receiver block 4 (step S502). If a picture is attached, mail information extracting block 10 extracts the picture data, and transfers it to user picture DB 6 in profile storing block 65 (step S503). User picture DB 6 stores the picture data from mail information extracting block 10 as the user picture of user A (step S504). Then, the process moves onto step S502.

If the picture is not attached to mail received by mail receiver block 4 in step S502 or after the picture was stored in user picture DB 6 in step S504, mail information extracting block 10 extracts mail information from the received mail and delivers it to communication growth level determination block 11 (step S505). Communication growth level determination block 11 stores the mail information from mail information extracting block 10 in mail information DB 14 (step S506). Then, communication growth level determination block 507 determines the communication growth level between users A and B, based on the mail information stored in mail information DB 14 (step S507), and stores the determined growth level in communication growth level DB 24 (step S508). According to this exemplary embodiment, the communication growth level between user A and B is assumed to be level 1.

By performing the above-described processing, each time mail is sent from terminal 100A to terminal 100B, the communication growth level is determined and the contents of communication growth level DB 24 is updated.

Next, the operation of view request processing, which is performed when a view request to view user A's profile is sent from terminal 100B of user B to server 300, is described with reference to the flowchart of FIG. 7.

Figure 7:
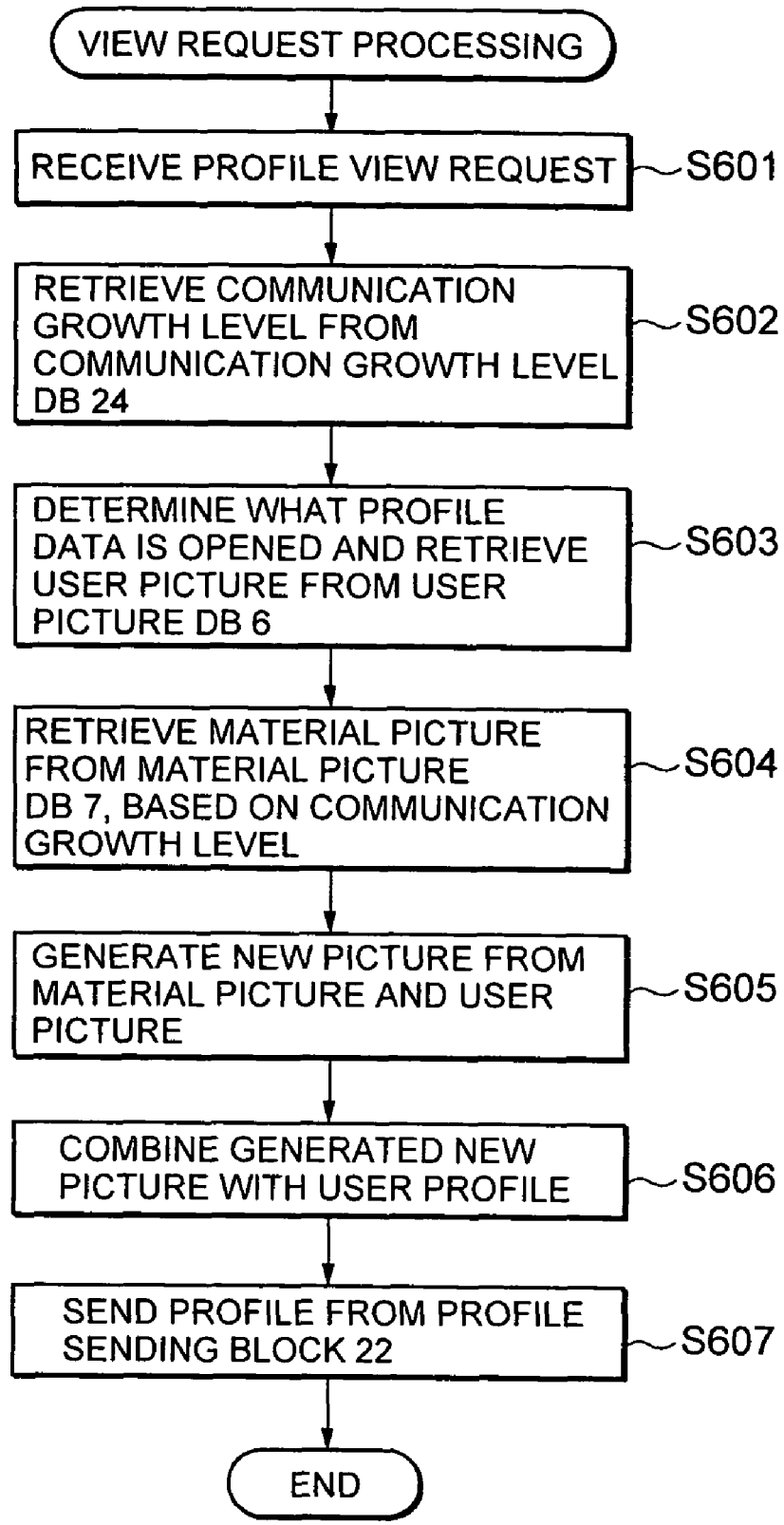
FIG. 7 is a flowchart illustrating the operation in view request processing of the server.

FIG. 7 is a flowchart illustrating the operation of view request processing in server 300.

Referring to FIG. 7, the profile view request from terminal 100B is received by profile view request receiving block 19 in the profile opening block 8 (step S601). Open profile information generating block 20 retrieves the communication growth level between user A and B from communication growth level DB 24 (step S602).

Based on the retrieved communication growth level, open profile information generating block 20 determines what kind of profile is opened for user B, and, based on that determination, retrieves the user picture of user A from user picture DB 6 (step S603) and retrieves a material picture from material picture DB 7 (step S604).

Open profile information generating block 20 generates a new picture from the material picture and user picture retrieved, based on the communication growth level (step S605), and combines the generated new picture with the user profile of user A, which is stored on user profile DB 23, thus generating a profile to be opened for user B (step S606).

Finally, the profile generated by open profile information generating block 20 is sent from profile sending block 22 to profile viewer block 17 of terminal 100B (step S607)

FIG. 8(a) shows a profile example of user A which is presented for user B if the communication growth level is level 1. Because of the low communication growth level, only the picture of an animal analogous to the user's image is presented with the profile information including only the user's sex.

FIG. 8(b) shows a profile example of user A which is presented to user B if the communication growth level is level 2. Because the communication growth level is higher than level 1, an avatar picture of user A is presented with the profile information including the user's sex and age.

FIG. 8(c) shows a profile example of user A which is presented to user B if the communication growth level is highest, level 3. The picture of user A's actual face is presented with the profile information including the user's sex, age and mail address.

As described above, according to the communication system of the exemplary embodiment, on server 300, based on mail that is sent from terminal 100A to terminal 100B, the communication growth level determination block 11 determines the communication growth level between user A and user B. When server 300 receives a profile view request to view user A's profile from terminal 100B, server 300 operates to change the contents of the profile to be opened based on the communication growth level from communication growth level DB 24. Thus, the range of user A's profile information to be opened by the view request from the user B is automatically extended, as the communication growth level becomes higher, along with frequent mail sending/receiving. Consequently, user A can open the user's profile while ensuring security.

Also, according to the communication system of the present exemplary embodiment, the user profile is automatically extended and changes, according to the communication growth level. As this level increases, the amount of information given to the other user increases and, as a result, the users can enjoy the communication between them without being bored and continue to have communication longs.

Furthermore, according to the communication system of the present exemplary embodiment, the profile changes, based onto the communication growth level and, thus, the user can know how much he or she has conversed with the other user on the web. Also, users can provide more information with reduced amount of user operation, which motivates them to easily subscribe to this service. Moreover, enhanced security motivates the users to register their pictures more readily as compared with conventional services.

Figure 8:
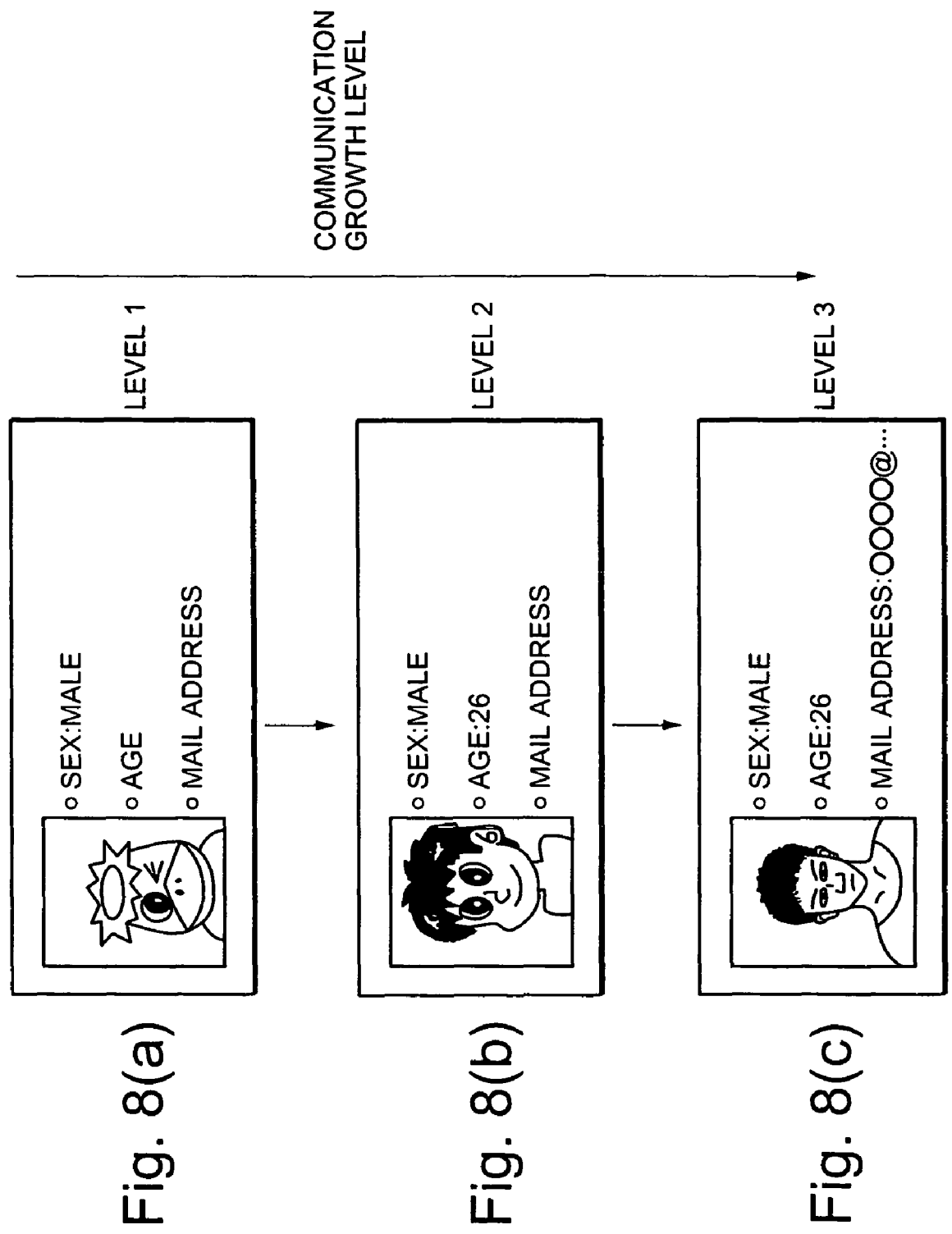
FIG. 8(*a*), 8(*b*) and (*c*) are diagrams showing profile examples which are presented by the profile viewer block.

While, in FIG. 8, an instance is shown where the picture included in the profile to be opened for user B changes from the animal picture analogous to the user's image to the avatar picture to the picture of user A's actual face, as the communication growth level rises, it is also possible for other pictures to be displayed, based on the change of the communication growth level. Various kinds of pictures can be used; for example, the picture of the face of an illustrious person analogous to the user's image, the picture of an animation character analogous to the user's image, or the picture of a plant analogous to the user's image.

For the implementation where a picture analogous to the picture of the user A's face is selected, it is also possible that many kinds of pictures are stored on material picture DB 7 beforehand and open profile information generating block 20 compares these pictures with the picture of the user's face stored on user picture DB 6 and automatically selects a picture that is analogous to the user's image.

It is also possible to present the profile with a picture that is the picture of user A's face obscured by mosaic for the first time and decreasing the mosaic portions of the picture, as the communication growth level rises. Moreover, it is also possible to present the profile with a back-shot picture of the user for the first time and gradually change that picture to a full-faced picture, as the communication growth level rises. It is also possible to modify the original picture of the user A through image processing to alter his or her apparent age, put his or her makeup on, combine the picture of the user's face with the picture of the face of another man or woman (morphing), refine the look, or modify the look to be foreign. For that implementation, the image processed portions of the picture should be reduced to be closer to the original picture, as the communication growth level rises.

As regards the profile information to be opened, as the communication growth level rises, it is also possible to open only the initial letters of the user name for the first time and open the full true name, as the communication growth level rises. For other profile specifics to be opened, in addition to sex, age, and mail address, diverse profile specifics such as address, hobby, height, or weight may be used.

Furthermore, as the communication growth level rises, not only extending the range of profile information to be opened, also changing the style of the costume that the user wears, his or her hair style, accessories that he or she wears, may make it possible for the viewer to easily sense the growth level of the communication with the other user.

Next, a communication system of another exemplary embodiment according to the present invention will be described.

In the first exemplary embodiment, which has been previously discussed, server 300 determines the communication growth level between these two users and gradually extends the range of profile information to be opened based on the determined communication growth level. On the other hand, in another exemplary embodiment, if it is determined that mail has been sent from user A to user B, it is determined that user A permits the opening of his or her profile for user B. Therefore, server 400 of another exemplary embodiment operates to open user A's profile for user B.

Figure 9:
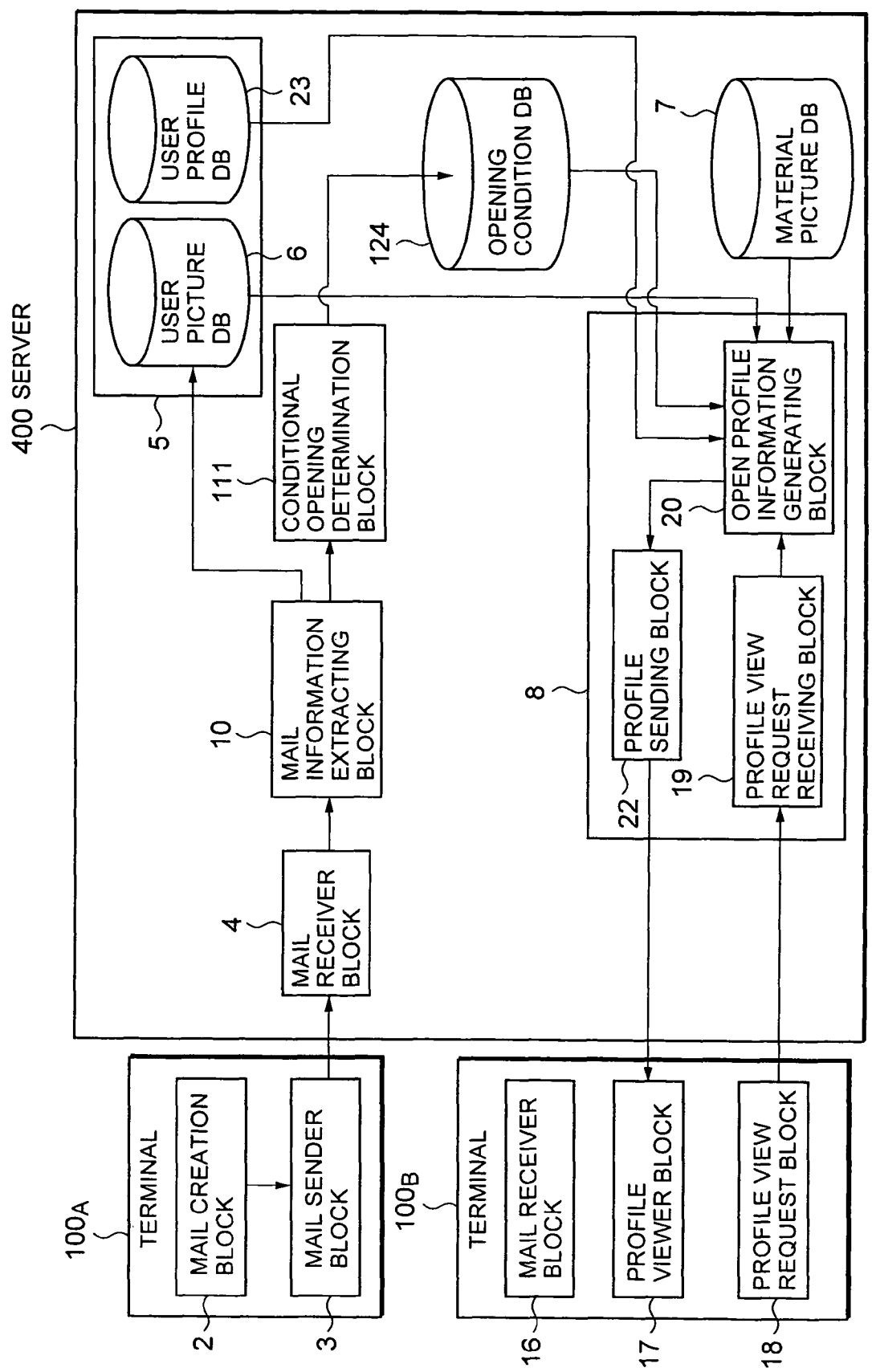
FIG. 9 is a block diagram showing the configuration of the server and the terminals of another exemplary embodiment according to the present invention.

FIG. 9 is a block diagram showing the configuration of server 400 and terminals 100A, 100B of another exemplary embodiment according to the present invention. In FIG. 9, components corresponding to those shown in FIG. 2 are assigned the same reference numbers and their explanation is not repeated.

The communication system of this exemplary embodiment includes server 400 in place of server 300 in the communication system of the former discussed embodiment. Server 400 eliminates mail information DB 14, which exists in server 300 in the former discussed embodiment shown in FIG. 2, and adds conditional opening determination block 111, which replaces the communication growth level determination block 11, and an opening condition DB 124, which replaces communication growth level DB 24.

Mail information extracting block 10 in this exemplary embodiment extracts header information including source and destination addresses from a mail received by mail receiver block 4 and delivers the header information to conditional opening decision block 111.

From the header information extracted by mail information extracting block 10, conditional opening determination block 111 conditionally determines whether or not to open the profile of one user to some other user. Opening condition DB 124 functions as an opening condition storing entity and stores opening conditions per pair of users determined by conditional opening determination block 111.

Moreover, when server 400 receives from one user terminal a profile view request to view the profile of the other user, open profile information generating block 20 reads the opening condition for communication between the view requesting user and the user for whom viewing the profile is requested from opening condition DB 124 and determines the opened profile.

According to this exemplary embodiment, there are between only two options, that is, whether or not open a user profile. However, because there is no need to store mail information, the mail information storing entity, like mail information DB 14 included in server 300 according to the former discussed exemplary embodiment shown in FIG. 2, can be eliminated. Thus, with it is possible to simplify the configuration.

Not only when mail has been sent from user A's terminal to user B's terminal, profile opening may be conditioned as follows: only after it is detected that mail has been sent from user B's terminal to user A's terminal and mail has been sent from user A's terminal to user B's terminal, user A's profile is opened for user B.

Furthermore, a profile may be opened when mail has been sent from user B's terminal to user A's terminal and mail has been sent from user A's to user B's terminal.

Other party's profiles may be opened for both user A and user B, respectively, at the same time.

According to the previously discussed embodiments, the range of profile information to be opened is based on the level of growth of communication between two users for whom a level decision has been made. In addition, charging may be performed, based on the determined communication growth level. Specifically, a higher fee could be charged to users who communicate with each other at a high communication growth level, rather than charging a fixed fee to all users. Applying a higher fee is reasonable because a high communication growth level indicates that they have made effective use of the communication site provided by the server 300.

The foregoing embodiments have been discussed by taking the topology example where terminal 100A of user A, terminal 100B of user B, and server 300 or 400 are interconnected by the Internet. However, the present invention is not so limited and can be applied in the same way to a system where the users' terminals and the server are interconnected by a wireless network and the like.

Furthermore, according to the foregoing, user profiles are automatically opened. However, it is also possible to fix a range of profile information to be opened by user settings beforehand so that the range is not automatically extended.

Servers 300, 400 in the described embodiments are equipped with a recording medium having a program stored thereon for implementing the above-described profile opening method. This recording medium may be a magnetic disk, a semiconductor memory, or some other type of recording medium. This program is read from the recording medium into servers 300, 400 and controls the operation of servers 300, 400. Specifically, under the control of this program, the CPU of servers 300, 400 instructs the hardware resources of servers 300, 400 to perform given processing tasks and, thereby, the above-described processing procedures are performed.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

What is claimed is:

1. A method for opening a user profile at an apparatus in a communication system on a computer network, the method comprising:
   receiving a request for a user profile of a first user from a second user; and
   determining contents of said user profile of said first user to be opened to said second user based on mail information on e-mail, which has been communicated between said first user and said second user in the communication system, wherein said contents are determined based on one or more of a group consisting of: a cumulative count of e-mail events between said first user and said second user, frequency of e-mail communication between said first user and said second user, a period from when an e-mail is sent or received between said first user and said second user to a present time, a total number of characters in said cumulative count of said e-mail events between said first user and said second user, and a total number of pictorial symbols included in said cumulative count of said e-mail events between said first user and said second user, wherein said contents are determined based on a first time elapsed after said first user receives e-mail from said second user until said first user sends a reply to said second user or a second time elapsed after said second user receives e-mail from said first user until said second user sends a reply to said first user, and wherein charging is performed based on said contents, which have been determined based on said cumulative count of e-mail events and said first time elapsed, or is performed based on said contents, which have been determined based on said cumulative count of e-mail and said second time elapsed.

2. The method claimed in claim 1, further comprising generating said user profile to be opened to said second user from a pre-stored user profile of said first user.

3. The method claimed in claim 1, further comprising generating a picture of said first user to be opened to said second user based on a pre-stored picture.

4. A method for opening a user profile at an apparatus in a communication system on a computer network, the method comprising:

receiving a request for a user profile of a first user from a second user;

determining, from mail information on e-mail, which has been communicated between said first user and said second user in the communication system, a level of growth of communication between said first user and said second user; and changing said user profile of said first user opened to said second user according to said determined level of growth of communication, wherein said level is determined based on a first time elapsed after said first user receives e-mail from said second user until said first user sends a reply to said second user or a second time elapsed after said second user receives e-mail from said first user until said second user sends a reply to said first user, and wherein said level is determined based on said mail information, which has been determined based on a cumulative count of e-mail events and said first time elapsed, or is determined based on said mail information, which has been determined based on one or more of a group consisting of: said cumulative count of e-mail and said second time elapsed, a period from when an e-mail is sent or received between said first user and said second user to a present time, a period from when an e-mail is sent or received between said first user and said second user to a present time, a total number of characters in said cumulative count of said e-mail events between said first user and said second user, and a total number of pictorial symbols included in said cumulative count of said e-mail events between said first user and said second user, and wherein charging is performed based on said determined level of growth of communication.

5. The method claimed in claim 4, further comprising generating said user profile to be opened to said second user from a pre-stored user profile of said first user.

6. The method claimed in claim 4, further comprising generating a picture of said first user to be opened to said second user based on a pre-stored picture.

7. The method claimed in claim 4, further comprising: charging a higher fee to users who communicate with each other at a higher level of growth of communication.

8. A method for opening a user profile at an apparatus in a communication system on a computer network, comprising allowing a communication system to open a user profile of a first user to a second user if e-mail is sent from said first user to said second user and e-mail is sent from said second user to said first in response to said e-mail sent from said first user to said second user, wherein allowing said communication system to open said user profile of said first user to said second user is based on time elapsed after said second user receives e-mail from said first user until said second user sends email to said first user in response to said e-mail sent from said first user to said second user, wherein charging is performed based on contents of the user profile as determined based on one or more of a group consisting of: a cumulative count of e-mail events between said first user and said second user and said time elapsed, frequency of e-mail communication between said first user and said second user, a period from when an e-mail is sent or received between said first user and said second user to a present time, a total number of characters in said cumulative count of said e-mail events between said first user and said second user, and a total number of pictorial symbols included in said cumulative count of said e-mail events between said first user and said second user.

9. The method claimed in claim 8, further comprising opening other party's profiles to both said first user and said second user, respectively, at a same time.

10. An apparatus for opening a user profile in a communication system on a computer network, comprising:

a receiver which receives a request for a user profile of a first user from a second user, and a determining circuit which determines contents of said user profile of said first user to be opened to said second user based on mail information on e-mail, which has been communicated between said first user and said second user in the communication system, wherein said determining circuit determines said contents based on one or more of a group consisting of: a cumulative count of e-mail events between said first user and said second user, frequency of e-mail communication between said first user and said second user, a period from when an e-mail is sent or received between said first user and said second user to a present time, a total number of characters in said cumulative count of said e-mail events between said first user and said second user, and a total number of pictorial symbols included in said cumulative count of said e-mail events between said first user and said second user, and wherein said determining circuit determines said contents based on a first time elapsed after said first user receives e-mail from said second user until said first user sends a reply to said second user or a second time elapsed after said second user receives e-mail from said first user until said second user sends a reply to said first user, and wherein charging is performed based on said contents, which have been determined based on said cumulative count of e-mail events and said first time elapsed or is performed based on said contents, which have been determined based on said cumulative count of e-mail and said second time elapsed.

11. The apparatus claimed in claim 10, further comprising a generator which generates said user profile to be opened to said second user from a pre-stored user profile of said first user.

12. The apparatus claimed in claim 10, further comprising a generator which generates a picture of said first user to be opened to said second user based on a pre-stored picture.

13. An apparatus for opening a user profile in a communication system on a computer network, comprising:
- a receiver which receives a request for a user profile of a first user from a second user;
- a determination circuit which determines, from mail information on e-mail between said first user and said second user in the communication system, a level of growth of communication between said first user and said second user; and
- a changer which changes said user profile of said first user opened to said second user according to said determined level of communication,
- wherein said determination circuit determines said level based on a first time elapsed after said first user receives e-mail from said second user until said first user sends a reply to said second user or a second time elapsed after said second user receives e-mail from said first user until said second user sends a reply to said first user, and
- wherein said level is determined by said determination circuit based on one or more of a group consisting of: a cumulative count of e-mail events and said first time elapsed, or said cumulative count of e-mail and said second time elapsed, frequency of e-mail communication between said first user and said second user, a period from when an e-mail is sent or received between said first user and said second user to a present time, a total number of characters in said cumulative count of said e-mail events between said first user and said second user, and a total number of pictorial symbols included in said cumulative count of said e-mail events between said first user and said second user, and
- wherein charging is performed based on said determined level of growth of communication which has been determined based on said mail information.

14. The apparatus claimed in claim 13, further comprising a generator which generates said user profile to be opened to said second user from a pre-stored user profile of said first user.

15. The apparatus claimed in claim 13, further comprising a generator which generates a picture of said first user to be opened to said second user based on a pre-stored picture.

16. An apparatus for opening a user profile in a communication system on a computer network, comprising:
- a receiver which receives e-mail; and
- an allowing circuit which allows a user profile of a first user to be opened to a second user if said receiver receives e-mail sent from said first user to said second user and e-mail sent from said second user to said first in response to said e-mail sent from said first user to said second user,
- wherein said allowing circuit allows said user profile of said first user to be opened by said second user based on time elapsed after said second user receives e-mail from said first user until said second user sends email to said first user in response to said e-mail sent from said first user to said second user,
- wherein charging is performed based on contents of the user profile as determined based on one or more of a group consisting of: a cumulative count of e-mail events between said first user and said second user and said time elapsed, frequency of e-mail communication between said first user and said second user, a period from when an e-mail is sent or received between said first user and said second user to a present time, a total number of characters in said cumulative count of said e-mail events between said first user and said second user, and a total number of pictorial symbols included in said cumulative count of said e-mail events between said first user and said second user.

17. The apparatus claimed in claim 16, further comprising an opening circuit which opens other party's profiles to both said first user and said second user, respectively, at a same time.

18. An apparatus for opening a user profile in a communication system on a computer network, comprising:
- a transmitter which transmits e-mail to a counterpart user apparatus through a server;
- a receiver which receives e-mail from said counterpart user apparatus, and
- a viewer which presents a user profile of a user of said counterpart user apparatus sent from said server, wherein said user profile includes contents determined by said server based on a cumulative count of e-mail events for e-mail communicated with said counterpart apparatus, and
- wherein said user profile includes contents determined by said server based on time elapsed after said transmitter transmits e-mail to said counterpart user apparatus until said receiver receives e-mail from said counterpart user apparatus,
- wherein charging is performed based on said contents of the user profile as determined based on one or more of a group consisting of: said cumulative count of e-mail events and said time elapsed, frequency of e-mail communication between said first user and said second user, a period from when an e-mail is sent or received between said first user and said second user to a present time, a total number of characters in said cumulative count of said e-mail events between said first user and said second user, and a total number of pictorial symbols included in said cumulative count of said e-mail events between said first user and said second user.

19. The apparatus claimed in claim 18, wherein said transmitter transmits a request signal to said server to obtain said user profile.

20. The apparatus claimed in claim 18, wherein said viewer presents a picture of said user of said counterpart apparatus generated by said server based on a pre-stored picture in said server.

21. An apparatus for opening a user profile in a communication system on a computer network, comprising:
- transmitting means for transmitting e-mail to a counterpart user apparatus through a server;
- receiving means for receiving e-mail from said counterpart user apparatus, and
- viewing means for presenting a user profile of a user of said counterpart user apparatus sent from said server, wherein said user profile includes contents determined by said server based on one or more of a group consisting of: a cumulative count of e-mail events for e-mail communicated with said counterpart apparatus, frequency of e-mail communication between said first user and said second user, a period from when an e-mail is sent or received between said first user and said second user to a present time, a total number of characters in said cumulative count of said e-mail events between said first user and said second user, and a total number of pictorial symbols included in said cumulative count of said e-mail events between said first user and said second user, and wherein said user profile includes contents determined by said server based on time elapsed after said transmitter transmits e-mail to said counterpart user apparatus until said receiver receives e-mail from said counterpart user apparatus, wherein charging is performed based on said contents of the user profile as determined based on said cumulative count of e-mail events and said time elapsed.

22. The apparatus claimed in claim 21, wherein said transmitting means transmits a request signal to said server to obtain said user profile.

23. The apparatus claimed in claim 21, wherein said viewing means presents a picture of said user of said counterpart apparatus generated by said server based on a pre-stored picture in said server.

\* \* \* \* \*